United States Patent Office 3,679,398
Patented July 25, 1972

3,679,398
PROCESS FOR THE PREPARATION OF ACICULAR, SUBMICROSCOPIC, PERMANENTLY MAGNETIZABLE METAL PARTICLES
John W. Geus, Geleen, Netherlands, assignor to Stamicarbon N.V., Heerlen, Netherlands
Filed Mar. 20, 1970, Ser. No. 21,466
Claims priority, application Netherlands, Mar. 22, 1969, 6904453
Int. Cl. C22b 5/00, 23/00
U.S. Cl. 75—108
6 Claims

ABSTRACT OF THE DISCLOSURE

The preparation of acicular cobalt-containing permanently magnetizable material is described wherein the pH value of a solution containing a cobalt salt and a ferrous salt, or a cobalt salt and a nickel salt or a combination of said three salts, is homogeneously increased at a controlled temperature and with agitation, following which the resulting precipitate is then subjected to a reductive treatment in a separate liquid phase.

---

Figure 1:
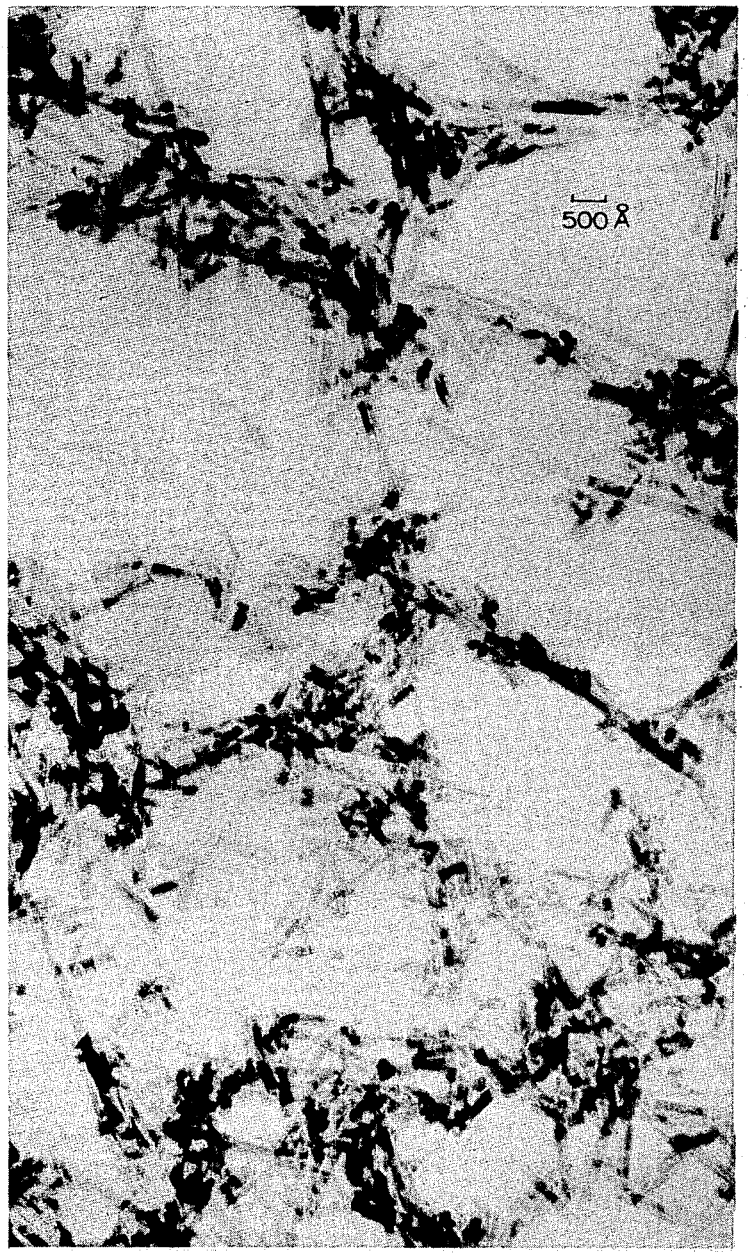

The present invention relates to a process for the preparation of an acicular, cobalt-containing, permanently magnetizable material by precipitation from an aqueous solution, whose pH is gradually and homogeneously increased, with simultaneous heating and agitation. The invention relates in particular to the preparation of acicular submicroscopic cobalt-containing metal particles.

By the process according to the invention, acicular particles containing cobalt and iron, cobalt and nickel, or a combination of these three elements are prepared by means of treatment of the corresponding mixed oxides or mixed hydroxides. The needles can be reduced to the corresponding alloy whilst retaining their shape. Consequently, they are extremely well suited for use as permanently magnetizable material. In particular, they may be used in objects for magnetic storage and reproduction of information, as for instance tapes, sheets or other shaped objects. An advantage of the metal per se over the usual oxide is the higher saturation magnetization. Thus, the saturation magnetization of $\gamma Fe_2O_3$, which is not almost universally used in magnetic tapes, is approximately 400 gauss, whereas for cobalt metal it is 1,400 gauss and for an iron-cobalt alloy, with 40 percent by weight of cobalt, it is even as high as 1,840 gauss. Furthermore, the shape anisotropy of the needles provided by this invention ensures a high remanence and high coercive force.

According to the known state of technology, permanently magnetizable particles homogeneously formed of at least two metal components (an alloy), in the form of submicroscopic needles, can be prepared by electrolysis of iron or iron-cobalt in mercury; see Luborsky, F. E., J. Appl. Phys., vol. 32, No. 3, 1961, pp. 171–183. The preparation and recovery of the particles found by the method there described is, however, disadvantageously laborious. It is further known from the German Auslegeschrift 1,205,068 to prepare acicular β-FeOOH by increasing the pH value of an aqueous solution of trivalent iron at elevated temperature. Said method does not indicate, however, that it is possible to prepare acicular mixed oxides or mixed hydroxides of the elements cobalt and iron, cobalt and nickel, or a combination of said three elements.

U.S. patent application No. 811,623, filed Mar. 28, 1969, abandoned in favor of continuing U.S. patent application No. 100,450 filed Dec. 21, 1970, describes a method for the preparation of mixed oxides of iron from an aqueous solution containing divalent iron, wherein pH is likewise increased. On the basis of that invention a new process was discovered for the present preparation of acicular submicroscopic, cobalt-containing metal particles.

According to the present invention, the pH value of a solution containing a cobalt salt and a ferrous salt, or a cobalt salt and a nickel salt, or a combination of said three salts, is homogeneously increased at a controlled temperature and with agitation, and the resulting precipitate which is formed is then subjected to a reductive treatment in a liquid phase after having been separated from the precipitating solution. It has now been found that to obtain the precipitated, reduced material in needle form it is essential that cobalt ions be present in the solution, and that any iron in such solution be present in the bivalent form.

By "controlled temperature" as used herein, is to be understood that a set temperature, or the variation in temperature with time, is adapted to the precipitation conditions required. This controlled temperature is preferably maintained within the range of about 50° C. to about 100° C. By "homogeneous" as used herein, is to be understood that the concentration of the ions in the solution does not vary with the location in the solution. If said conditions just described are carefully complied with, acicular cobalt-containing mixed oxides and/or mixed hydroxides will be precipitated.

Whilst the pH value can be increased by means of urea, as is done in the method described in the U.S. patent application Ser. No. 886,693, filed Dec. 19, 1969, abandoned in favor of continuation-in-part U.S. patent Ser. No. 108,081 filed Jan. 20, 1971, it has been found that the pH value of the solution is preferably increased by injection of an alkaline solution, for example, an ammonia bicarbonate solution and/or an ammonia solution. By "injection" is to be understood in this context that there is meant that the alkaline solution and the metal salt solution are brought into direct contact with one another without any other phase being in the immediate vicinity.

The type of reaction conditions required with a given concentration of the metal ions in the solution are illustrated in more detail in the examples.

The metal salts used may be simple salts, whilst such other reagents can be chosen that no harmful residue will remain behind in the alloy.

When attempts have been made to reduce the precipitated material in the gas phase system, it was found that even at a relatively low temperature, for instance 200° C., the particles sintered to such an extent that more or less spherosymmetric particles of sizes larger than 2000 angstrom units were formed.

Theresfore, in order to attain the objective of this invention, it is necessary to reduce the precipitated material in a liquid medium. This reduction of the subject metal oxides or hydroxides of the needle precipitate can be achieved at room temperature in an aqueous or alcoholic medium, at a pH higher than 6.5, and with the aid of hypophosphites or boron hydride; see Oppegard, A. L. Darnell, F. J. and Miller, H. C., J. Appl. Phys., 32, 184S (1961), and Fischer, R. D., Chilton, W. H., J. Electrochem. Soc., 109, 485 (1962) for descriptions of the chemistry involved. The reduction may also be carried out in an apolar liquid, such as benzene or hexane, with the aid of alkali hydrides, boron hydride, alkali aluminum hydride or aluminum alkyl. Employing this method, the particulate product will be completely in the reduced state.

The resulting product formed by the process carried out in accordance with the present invention is typically acicular, submicroscopic, permanently magnetizable, cobalt-containing metal alloy particles having a length in the range of 500 to 2000 angstrom units and a diameter of 100 to 300 angstrom units.

If required, the metallic needles may finally be passivated by contact with an inert gas, containing 0.05 to 1% oxygen and/or 0.5 to 5% nitrous oxide.

The invention will now be elucidated by means of the following examples, which are illustrative but not limitative.

EXAMPLE I

Preparation of acicular cobalt-iron $CoCl_2 \cdot 6H_2O$ (84.4 grams) was dissolved in water (2 liters), which had been boiled, and cooled under nitrogen. Next, 120 ml. of a $FeCl_2$ solution, containing 9 grams of Fe, was added. The solution thus obtained was heated to 100° C., whereupon, in a period of 2 hours, a solution of 45 grams of $NH_4HCO_3$ and 40 ml. of a 25% ammonia solution in 0.5 liter of water was injected, under nitrogen, and with simultaneous agitation below the liquid level. Over the last 15 minutes of the said injection, the suspension cooled off gradually. At the end of the said injection, the pH of the solution was approximately 8.

Subsequently, the suspension could be very quickly filtered off under air and washed. The filtrate contained a very small quantity of iron. During the filtration, the color of the precipitate changed from pink to brown. The material was weakly magnetic. An analysis showed that it contained 16.4 percent by weight of iron and 37.5 percent by weight of cobalt. FIG. 1 shows an electron microphotograph of the material obtained. The acicular structure can be seen very clearly. The material displayed a very peculiar X-ray pattern that is not described before. The most important d-values are: 8.8 (s), 5.1 (s), 3.4 (m), 2.9 (m), 2.6 (m).

Next, the dried material was suspended in 1½ liters of hexane. Thereafter, a solution of 20 grams of lithium aluminium hydride in ½ liter of hexane was injected, under nitrogen, below the liquid level in a period of 30 minutes, with simultaneous agitating. The solid matter was subsequently filtered off under nitrogen, washed with alcohol and dried. Finally the material was passivated for 96 hours in a stream of nitrogen containing 0.1 percent of volume of oxygen, at a temperature of 20° C., whereupon it was ready for further application.

EXAMPLE II

Figure 2:

Preparation of acicular cobalt-nickel $Ni(NO_3)_2 \cdot 6H_2O$ (78 grams), $Co(NO_3)_2 \cdot 6H_2O$ (152 grams) and urea (100 grams) were dissolved in 3 liters of water, whose pH value had been adjusted to 1.5 with nitric acid. The solution was then heated to a temperature of 76° C. in a period of 2 hours, with agitation. This temperature was maintained for 20 hours, whereupon the pH had risen to 5.8. Finally, the solution was heated to boiling temperature, and the pH value was increased to 6.5 by injection of a solution of ammonia and ammonium bicarbonate (180 ml. of a 25% solution and 210 grams, respectively in 0.6 liter). The precipitate thus obtained was filtered off. The filtration proceeded very quickly and the filtrate contained very little nickel. The violet filtration residue was then washed, and dried for 16 hours at 120° C. FIG. 2 shows an electron microphotograph of the material thus obtained illustrating, clearly, the acicular structure of this product. Next, the reduction and passivation were carried out by the method of Example I, whereupon the material was ready for use.

It will be understood from the foregoing disclosure that in the process of this invention the aqueous solution from which the precipitate is formed should initially have a pH below 5.5. Whatever the initial pH employed may be, during the conduct of the process, the pH of the solution is increased, in the manner described, to a level of about 6.9 to 7.8, preferably 7.2 to 7.4. Agents for this increase in the pH, in addition to those already described are in general, any suitable inorganic or organic amine material having a basicity sufficiently strong to effect the required increase in the pH.

In the practice of the invention, the precipitate is generally obtained in the form of mixed oxides and/or mixed hydroxides, as disclosed, of the heavy metal components present in the solution. Following the above-described reduction treatment, these oxides and/or hydroxides are substantially converted to the metals per se, in the form of an alloy—that is, individual parties of the resulting acicular product are composed of both (or all three) heavy metals present in the original solution—particles solely composed of cobalt or iron or nickel are substantially absent from this product.

During the reduction step, the aqueous or alcoholic medium may contain any suitable ingredient for inducing a pH level above the required value of 6.5, preferably, of course, an agent which will not undesirably contaminate the solid particulate material desired for the product. Suitable agents for this purpose may include ammonia, ammonium bicarbonate and ammonium carbonate. By alcoholic medium, it is meant, of course an aqueous medium containing from 25 to 98% of a water-miscible alkyl alcohol having up to, for instance, 4 carbon atoms. Alternatively, as the reduction is carried out in the "apolar liquid," such liquid may be chosen from aromatic hydrocarbons including, in addition to benzene, such common normally liquid hydrocarbons as toluene, xylene, ethylbenzene, and the like. Similarly, in place of hexane, a similar lower alkane normally liquid hydrocarbon may be employed, e.g., alkanes having from 5 to 10 carbon atoms, or mixtures thereof.

In the formation of the original solution, as well as the precipitate formed, the cobalt, iron and nickel salts should be present in a concentration of about 5 to 25% by weight, and such that the ratio of cobalt to other metals present may range (in parts by weight) from 10:1 to 1:1.

It will accordingly be understood that while the invention has been illustrated with specific examples, those objectives can be achieved by operations other than those specific methods, while in keeping with the spirit and scope of the foregoing disclosure and following claims.

I claim:

1. A process for the preparation of an acicular, permanently magnetizable, cobalt-containing, metal alloy particulate material which consists essentially in forming an aqueous solution containing a soluble cobalt salt and a soluble ferrous salt, or a soluble cobalt salt and a soluble nickel salt, or a combination of said three salts, said cobalt salt being in major proportion in said solution and said solution having a pH below 5.5;

gradually and homogeneously increasing the pH of said solution to a level within the range of from about 6.9 to 7.8 while the temperature is maintained within the range of from about 50° C. to about 100° C. with agitation and, when a ferrous salt is present, in the absence of molecular oxygen, to thereby form a needle shaped precipitate, said gradual and homogeneous increase in pH being effected through the addition of an agent selected from the group consisting of an alkaline solution, which is injected into said aqueous solution under the surface thereof, and urea, which is thereafter hydrolyzed;

separating said needle shaped precipitate from said aqueous solution; and thereafter subjecting the same to a reductive treatment in a liquid phase thereby obtaining an acicular permanently magnetizable metal material having a length in the range of from about 500 to 2000 angstrom units and a diameter of from about 100 to 300 angstrom units.

2. The process of claim 1 wherein said salts are selected from the class consisting of chloride, nitrate, sulfate and acetate.

3. The process of claim 1 wherein said reductive treatment is carried out in an aqueous or alcoholic liquid phase having a pH value above about 6.5.

4. The process of claim 3 wherein there is used a hypophosphite or boron hydride as the reductive agent.

5. The process of claim 1 wherein said reductive treatment is carried out in an apolar liquid phase, and a member selected from the class consisting of alkali metal hydrides, boron hydrides, alkali aluminum hydride and aluminum alkyls is employed as the reductive agent.

6. The process of claim 5 wherein said apolar liquid is selected from the class consisting of liquid aromatic hydrocarbons and liquid alkane hydrocarbons.

References Cited

UNITED STATES PATENTS

| | | | |
|---|---|---|---|
| 2,879,154 | 3/1959 | Campbell | 75—.5 AA |
| 3,399,050 | 8/1968 | Evans et al. | 75—.5 AA |
| 3,567,525 | 3/1971 | Graham et al. | 75—.5 AA X |
| 3,240,782 | 3/1966 | Brossi et al. | 252—472 X |
| 3,136,621 | 6/1964 | Pearson | 75—.5 AA |
| 3,206,338 | 9/1965 | Miller et al. | 148—105 |

GEORGE T. OZAKI, Primary Examiner

U.S. Cl. X.R.

75—.5 AA, 119, 123, 170; 148—105; 252—62.55